United States Patent [19]

Stark

[11] Patent Number: 4,845,468
[45] Date of Patent: Jul. 4, 1989

[54] BRAKE CONDITION WARNING SYSTEM
[75] Inventor: Robert A. Stark, Gurnee, Ill.
[73] Assignee: Dresser Industries, Inc., Dallas, Tex.
[21] Appl. No.: 146,423
[22] Filed: Jan. 21, 1988
[51] Int. Cl.[4] .............................................. B60Q 1/00
[52] U.S. Cl. .................................... 340/454; 340/451; 188/1.11
[58] Field of Search ................ 340/52 A, 52 B, 52 C; 188/151 R, 1.11

[56] References Cited

U.S. PATENT DOCUMENTS

| | | | |
|---|---|---|---|
| 1,690,121 | 11/1928 | Klimek | 188/1.11 X |
| 1,907,540 | 5/1933 | Hebler | 188/1.11 X |
| 3,593,266 | 7/1971 | Van Sickle | 340/52 |
| 3,887,899 | 6/1975 | Kawaguchi et al. | 340/52 |
| 4,025,781 | 5/1977 | Brearley | 340/52 |
| 4,184,145 | 1/1980 | Fima | 340/52 |
| 4,186,822 | 2/1980 | Khuntia et al. | 188/1 A |
| 4,201,974 | 5/1980 | Fima | 340/52 |
| 4,508,196 | 4/1985 | Jamon | 188/1.11 |
| 4,520,661 | 6/1985 | Tamai et al. | 188/1.11 X |
| 4,649,370 | 3/1987 | Thomason | 340/52 B |

FOREIGN PATENT DOCUMENTS 3714273 11/1987 Fed. Rep. of Germany .
101863 6/1983 Japan ................................. 340/52 A Primary Examiner—Joseph A. Orsino
Assistant Examiner—Jeffery A. Hofsass
Attorney, Agent, or Firm—Edward G. Fiorito; William R. Peoples; Roy L. Van Winkle

[57] ABSTRACT

A brake condition warning system for liquid cooled brakes that includes an indicator showing whether pressure in the cooling liquid passing through the erodable brake members has exceeded an acceptable valve which corresponds to an excessive amount of brake wear. Also, there may be included temperature sensitive means for sensing the temperature of the liquid in the chamber preventing the pressure indication until the cooling liquid has reached a predetermined operating temperature thus preventing false indications of excessive wear due to the viscosity of cold cooling liquid.

8 Claims, 1 Drawing Sheet

BRAKE CONDITION WARNING SYSTEM

BACKGROUND OF THE INVENTION

This invention generally relates to a warning system for indicating the wear condition of brake linings. More particularly, but not by way of limitation, this invention relates generally to a warning system for indicating the wear conditions of liquid cooled brakes such as those used in heavy off road type vehicles.

Brake systems utilized in heavy off road vehicles are subjected to a substantial amount of wear due to the frequent starting and stopping and the changing of directions of the vehicle. Brake systems that are liquid cooled, are relatively complex to disassemble and reassemble to check the condition of the brakes. It requires substantial time and effort to make such checks. Accordingly, it is highly desirable to be able to provide a brake wear condition indicating system that remotely indicates the condition of the brakes without the necessitating the disassembly of the brake system.

Many attempts have been made in an effort to indicate the brake wear condition from a remote location. Among those is the system described in U.S. Pat. No. 1,690,121 issued Nov. 6, 1928 to A. Klimk. The system described therein displaces liquid from a cylinder as the brake bands wear. The liquid is piped to a remote location and is connected with an indicator which shows the brake wear condition.

An electrical or light system for indicating brake wear condition is described in U.S. Pat. No. 4,184,145, issued Jan. 15, 1980, to a Raoul G. Fima. Systems utilizing pneumatic signals are illustrated in U.S Pat. No. 3,593,266 issued July 13, 1971, to John K. Van Sickle and U.S. Pat. No. 4,201,974, issued May 6, 1980 to Raoul G. Fima.

U.S. Pat. No. 4,186,822, issued Feb. 5, 1982, to Natabara Khuntia describes a mechanical system for indicating the condition of the brakes. The system utilizes a hole formed in the brake housing (with removable plug) through which a measurement can be made to ascertain the wear condition. The measurement is made through the hole from a known surface within the brake system to the exterior of the housing at the hole. It is necessary to mechanically measure each brake but the system is an improvement over totally disassembling a very complex, liquid cooled brake system.

An object of this invention is to eliminate the necessity for disassembling of the brake system and to eliminate the necessity for mechanical measurement to ascertain the wear condition of the brakes of a vehicle.

SUMMARY OF THE INVENTION

This invention then provides an improved brake condition warning system for liquid cooled brake systems that include grooved erodable brake members or pads wherein the cooling liquid flows therethrough. The warning system involves the use of means for measuring and indicating the pressure of the liquid flowing through the system, that is, of the liquid flowing through the grooves. As the brake member erodes during use, the grooves become smaller with less flow area and the pressure on the liquid flowing therethrough increases providing an indication of the amount of wear occurring on the brakes.

In another aspect, this invention provides a method of determining the condition of the brakes that includes the steps of sensing and indicating the pressure of the cooling liquid as it flows through the system. As the pressure increases greater wear is indicated.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION PREPARED EMBODIMENT

Figure 1:
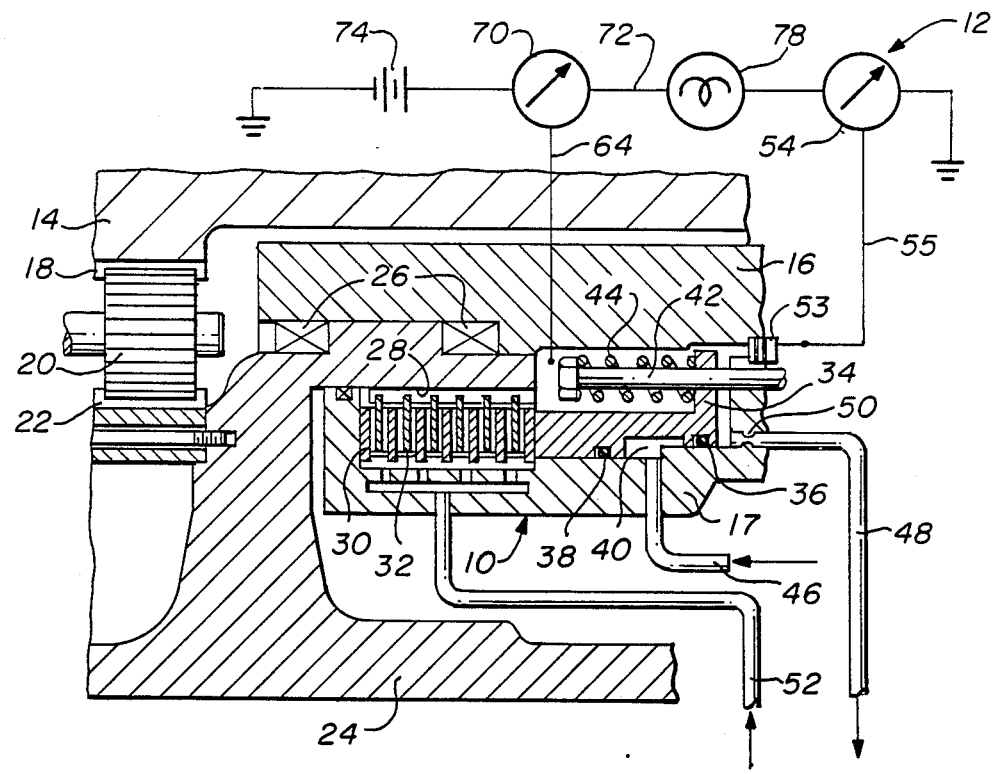
FIG. 1 is a view, partly in cross section and partly schematic, illustrating a liquid cooled brake system having a brake condition warning system that is constructed in accordance with the invention.

Referring to the drawing and to FIG. 1 in particular, shown therein in generally designated by the reference character 10 is a liquid cooled brake system suitable for use in off road type vehicles (not shown). The brake system 10 includes a brake warning system 12 that is constructed in accordance with the invention.

The vehicle includes a drive axle 14 extending through an axle housing 16 that is fixed relative to the axle 14. An axle 14 is provided with gear teeth 18 on the exterior thereof which meshes with a spur gear 20 forming part of the planetary gear drive for a vehicle wheel or hub 24. The spur gear 20 is in mesh with the teeth 22 of a ring gear that is carried by a vehicle wheel 24. The vehicle wheel is supported by bearings 26 on the housing 16 and is therefore rotatable relative thereto.

The wheel or hub 24 and the brake housing 17 which is attached to the axle housing 16 cooperate to form an annular brake chamber 28 that has a plurality of alternately arranged annular brake members 30 and 32 located therein. At the opposite end of the chamber 28, there is provided a brake piston 34, which is of annular configuration and carries seals 36 and 38 on the exterior thereof. The seals 36 and 38 are in sliding and sealing engagement with the brake housing 17.

The piston 34 has one end in engagement with the brake members 30 and 32 and has a cavity in the exterior thereof forming a brake fluid chamber 40. Also disposed in the chamber 28 is a stud 42 which carries a spring 44 on the exterior thereof. One end of the spring 44 is in engagement with the piston 34 and urges the piston 34 away from the brake members 30 and 32. Conduit 46 is connected with the brake fluid chamber 40. Although not shown, the opposite end of the conduit 46 will be connected with the appropriate valve mechanisms so that fluid under relatively high pressure may be introduced into the brake fluid chamber 40 to move the piston 34 against the brake members 30 and 32 to set the brakes and to release the brake fluid therefrom permitting the spring 44 to drive the piston 34 away from the brake members 30 and 32 releasing the brake.

Two conduits extend into the cavity 28. A conduit 48 is connected with the chamber 28. The opposite end to the conduit 48 is connected to a source of pressurized liquid (not shown). An orifice 50 is located to control the fluid flowing from the conduit 48 into the chamber 28. It should also be pointed out that since the liquid in the chamber 28 will be substantially surrounding all of the components thereof, there will be no pressure bias on the components from the pressurized cooling liquid flowing therein.

A return conduit 52 has one end connected to the chamber 28 to receive the cooling liquid flowing from the chamber 28. The opposite end of the conduit 52 will be connected into the cooling system supply, which is usually the transmission.

A pressure transducer 53 connected to 62 and chamber 28 is utilized for supplying a signal to pressure gauge 54 through a conductor 55. The gauge 54 may be located on the dash of the vehicle if desired. The gauge 54 preferably has a normally open switch (not shown) therein for purposes that will be described hereinafter.

Figure 2:
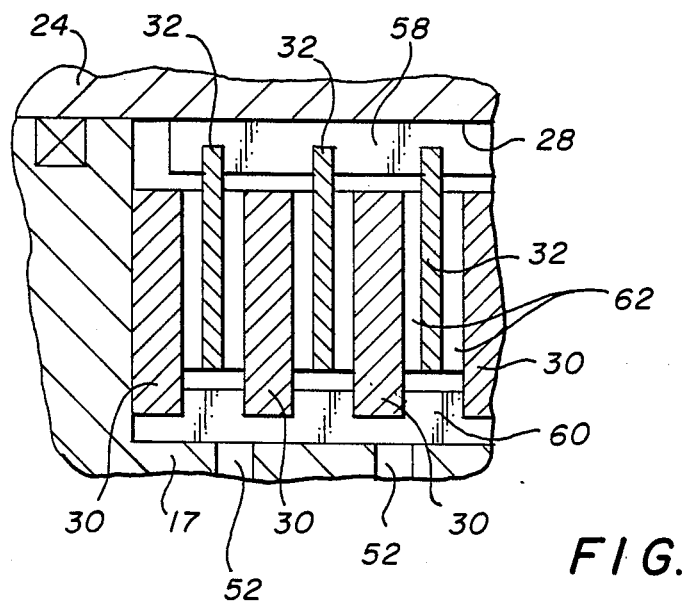
FIG. 2 is an enlarged, fragmentary, cross-sectional view of a portion of the system of FIG. 1, illustrating the brake members in more detail.

The arrangement of the brake members 30 and 32 can be seen more clearly in the enlarged, fragmentary view of FIG. 2. As shown therein, the interior of the hub 24 is provided with splines 58 that are engaged by the inner periphery of each of the brake members 32. Similarly, the interior of the brake housing 17 is provided with splines 60 for receiving the outer periphery of each of the brake members 30. With such a structural arrangement, the brake members 32 are attached to and rotate with the hub 24 and the brake members 30 are attached to and held stationary by the brake housing 17. Thus, relative rotation occurs between the brake members 30 and 32 when the wheel 24 is in motion.

As may also be seen in FIG. 2, each side of the members 32 are provided with grooves 62. Although only one groove 62 is shown on each side of the brake members 32, it will be understood that the brake members 30 and 32 are both annular in configuration and that the grooves 62 are circumferentially spaced about the members 32.

With the grooves 62 provided in the members 32, a flow passageway is completed through the chamber 28 permitting cooling liquid to enter through the conduit 48, pass the orifice 50, pass through the grooves 62, and to exit through the return conduit 52. As will be appreciated, the grooves 62 define a flow passageway of known dimension when the brake members 32 are new. It should also be pointed out that the brake members are constructed from a material that which is designed to frictionally engage the brake members 30 to stop the vehicle. At the same time, the brake members 32, being constructed from an erodable material, will gradually be worn away during use reducing the flow area of the grooves 62 and causing an increase in the pressure of the cooling liquid flowing therethrough.

Returning to FIG. 1, a temperature probe 64 has one end disposed in the chamber 28 for the purpose of sensing the temperature of the cooling liquid flowing therethrough. The probe 64 is connected with a gauge 70 having normally open switch means (not shown) therein that is designed to receive the temperature signal from the probe 64. The temperature gauge 70 may be mounted on the dash if desired.

The gauge 70 is designed so that at a predetermined operating temperature of the cooling liquid, for example, at 150° F., the switch closes electrically connecting the power source 74 to a warning lamp 78 and pressure gauge 54. Thus, an operator viewing the gauges 54 and 70 will know the pressure and temperature of the cooling liquid flowing through the chamber 28. As described, the temperature gauge 70 and the pressure gauge 54 are arranged in a series relationship so that before the electrical circuit is completed through the warning lamp 78 the temperature of the liquid flowing through the chamber 28 must be in excess of the preselected operating temperature and the pressure in the chamber 28 must be above a preselected value corresponding to the limit of acceptable wear of the brake members 32. The reason for such arrangement is to avoid false readings of brake wear as will be discussed hereinafter.

OPERATION OF THE PREFERRED EMBODIMENT

When the vehicle (not shown) is in motion, the wheel or hub 24 is rotating in the brake housing 17 driving the brake members 32 relative to the brake members 30. When it is desired to stop the vehicle, pressure is applied through the conduit 46 on the liquid in the brake chamber 40 displacing the piston 34 relatively to the left as seen in FIG. 1 bringing the brake members 30 and 32 into tight frictional engagement until the motion of the vehicle is arrested.

During this time, cooling liquid is being pumped through the conduit 48 into the chamber 28 through the grooves 62 for the purpose of dissipating the heat generated by the frictional engagement of the brake members 30 and 32. As previously mentioned, the brake members 32 are constructed from an erodable material and the frictional engagement with the members 30 over a period of time reduces the cross-sectional area of the passageways 62. As the cross-sectional area of the passageways 62 decrease in size, resistance to the flow of the cooling liquid through the passageways 62 causes a pressure increase in chamber 28. Such an increase in pressure is sensed by the transducer 53 and transmitted through the conductor 55 to the gauge 54. If the vehicle has been in operation sufficiently long for the temperature of the cooling liquid in the chamber 28 to reach the preselected operating temperature, the switch in gauge 70 closes. If the members 32 are sufficiently worn, the pressure of the liquid in the chamber 28 closes the switch in the pressure gauge 54 completing the electrical circuit through the warning lamp 78. Since the pressure has exceeded the predetermined valve for maximum wear of the brake members 32, as indicated by the warning lamp 78, the operator disassembles the brakes and repairs or replaces the members 32.

Thus, and from the foregoing detailed description, it can be seen that the condition of the brake members 32 is reflected as pressure in the chamber 28 which can be observed by the operator of the vehicle so that he will be able to ascertain the condition of the brake members 32. When the predetermined amount of erosion or wear has occurred on the members 32 the operator will be alerted to the fact that the brakes need to be repaired by either the lamp 78, the gauge 54, or both without necessity of disassembling of the wheels or making any other local or mechanical check thereof.

Having described but a single embodiment of the invention, it will be understood that many changes and modifications can be made thereto without departing from the spirit and scope of the invention.

What is claimed:

1. An improved brake condition warning system for use with a liquid cooled brake system that includes fixed brake means, moveable brake means, a grooved erodable brake member attached to one of said brake means, and brake applying means for causing engagement of said brake means and member, the improvement comprising:

pressure transducer means for sensing the pressure of the cooling liquid flowing through the grooves in the brake member of the brake system and for transmitting a signal indicator thereof; and, pressure indicator means operably connected with said transducer means for receiving said signal and for indicating said pressure thereby indicating the wear condition of said brake member.

2. The warning system of claim 1 and also including:

temperature transducer means for sensing the temperature of the cooling liquid and for transmitting a signal indicator thereof; and, temperature indicator means operably connected with said temperature transducer means for indicating the temperature of the cooling liquid to determine whether said temperature is below a predetermined operating value.

3. The warning system of claim 2 also including means connecting said pressure indicator means and temperature indicator means in series for preventing said pressure indicator means from indicating cooling liquid pressure when said cooling liquid temperature is below a predetermined operating value.

4. The warning system of claim 3 and also including:

a warning lamp; and, means connecting said warning lamp to said pressure indicator means and temperature indicator means for energizing said warning lamp only when said cooling liquid temperature and pressure are above predetermined values.

5. A method for remotely determining the wear condition of an erodable grooved brake member in a liquid cooled brake system said method comprising the steps of:

sensing the pressure of the cooling liquid flowing through grooves in the brake member of the brake system;

transmitting a signal indicative of said pressure; and, receiving said signal and indicating the value of said pressure to indicate the wear condition of said brake member.

6. The method of claim 5 and also including the steps of:

sensing the temperature of the cooling liquid;

transmitting a signal indicative of said temperature; and receiving said signal and indicating the value of said temperature to determine whether said liquid is above a preselected operating temperature.

7. The method of claim 6 and including the steps of:

connecting temperature and pressure indicators in electrical series;

comparing the temperature of said cooling liquid to a preselected operating value;

and energizing said pressure indicator when said temperature is above said preselected valve to indicate the cooling liquid pressure.

8. The method of claim 7 and also including the steps of:

connecting a warning lamp to said pressure indicator;

comparing said pressure signal to a predetermined operating value; and, energizing said lamp when said cooling liquid pressure exceeds said predetermined operating value and when said cooling liquid temperature is above said preselected value to indicate an unacceptable brake wear condition.

* * * * *